US011194666B2

(12) United States Patent
Meiri et al.

(10) Patent No.: US 11,194,666 B2
(45) Date of Patent: Dec. 7, 2021

(54) TIME ADDRESSABLE STORAGE IN A CONTENT ADDRESSABLE STORAGE SYSTEM

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 76 days.

(21) Appl. No.: 16/395,595

(22) Filed: Apr. 26, 2019

(65) Prior Publication Data

US 2020/0341848 A1    Oct. 29, 2020

(51) Int. Cl.
| G06F 16/901 | (2019.01) |
| G06F 16/17 | (2019.01) |
| G06F 16/11 | (2019.01) |
| G06F 16/903 | (2019.01) |
| G06F 11/14 | (2006.01) |

(52) U.S. Cl.
CPC ........ *G06F 11/1435* (2013.01); *G06F 16/128* (2019.01); *G06F 16/1734* (2019.01); *G06F 16/9014* (2019.01); *G06F 16/90339* (2019.01)

(58) Field of Classification Search
CPC ........... G06F 11/1435; G06F 16/90339; G06F 16/9014; G06F 16/1734; G06F 16/128
See application file for complete search history.

(56) References Cited

U.S. PATENT DOCUMENTS

| 6,496,908 B1 | 12/2002 | Kamvysselis et al. |
| 6,553,464 B1 | 4/2003 | Kamvysselis et al. |
| 6,640,280 B1 | 10/2003 | Kamvysselis et al. |
| 6,862,632 B1 | 3/2005 | Halstead et al. |
| 6,883,018 B1 | 4/2005 | Meiri et al. |
| 6,886,164 B2 | 4/2005 | Meiri |
| 6,898,685 B2 | 5/2005 | Meiri et al. |
| 6,910,075 B2 | 6/2005 | Marshak et al. |
| 6,938,122 B2 | 8/2005 | Meiri et al. |

(Continued)

OTHER PUBLICATIONS

U.S. Appl. No. 15/001,789, filed Jan. 20, 2016, Meiri et al.

(Continued)

*Primary Examiner* — Nanci N Wong
(74) *Attorney, Agent, or Firm* — Daly, Crowley, Mofford & Durkee, LLP

(57) ABSTRACT

Time addressable storage in a content addressable storage system includes providing a log volume having an index and a journal. For each snapshot, an identifier is entered in the index and a corresponding journal offset is increased. For each write transaction received for a volume, an aspect includes recording a time, address, and hash handle as entries in the journal. Upon receiving a point in time (PIT) for one of the volumes, an aspect includes identifying a most recent snapshot (S) created before the PIT, taking a snapshot (S') of snapshot (S), identifying a journal corresponding to the snapshot (S) in the index, and reviewing entries of the identified journal up to the PIT. An aspect further includes updating the snapshot (S') with a corresponding hash handle for each address appearing in the entries until all write transactions before the PIT are contained in the snapshot (S').

20 Claims, 10 Drawing Sheets

(56) References Cited

U.S. PATENT DOCUMENTS

| | | |
|---|---|---|
| 6,944,726 B2 | 9/2005 | Yoder et al. |
| 6,968,369 B2 | 11/2005 | Veprinsky et al. |
| 6,976,139 B2 | 12/2005 | Halstead et al. |
| 7,000,086 B2 | 2/2006 | Meiri et al. |
| 7,024,525 B2 | 4/2006 | Yoder et al. |
| 7,032,228 B1 | 4/2006 | McGillis et al. |
| 7,051,176 B2 | 5/2006 | Meiri et al. |
| 7,054,883 B2 | 5/2006 | Meiri et al. |
| 7,113,945 B1 | 9/2006 | Moreshet et al. |
| 7,114,033 B2 | 9/2006 | Longinov et al. |
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Marshak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longinov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,702,871 B1 | 4/2010 | Arnon et al. |
| 7,870,195 B1 | 1/2011 | Meiri |
| 8,046,545 B2 | 10/2011 | Meiri et al. |
| 8,078,813 B2 | 12/2011 | LeCrone et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,468,180 B1 | 6/2013 | Meiri et al. |
| 8,578,204 B1 | 11/2013 | Ortenberg et al. |
| 8,600,943 B1 | 12/2013 | Fitzgerald et al. |
| 8,677,087 B2 | 3/2014 | Meiri et al. |
| 8,694,700 B1 | 4/2014 | Natanzon et al. |
| 8,706,959 B1 | 4/2014 | Arnon et al. |
| 8,719,497 B1 | 5/2014 | Don et al. |
| 8,732,124 B1 | 5/2014 | Arnon et al. |
| 8,782,357 B2 | 7/2014 | Halstead et al. |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,914,596 B2 | 12/2014 | Lecrone et al. |
| 8,966,211 B1 | 2/2015 | Amen et al. |
| 8,977,826 B1 | 3/2015 | Meiri et al. |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,110,693 B1 | 8/2015 | Meiri et al. |
| 9,208,162 B1 | 12/2015 | Hallak et al. |
| 9,286,003 B1 * | 3/2016 | Hallak ............... G06F 16/9014 |
| 9,304,889 B1 | 4/2016 | Chen et al. |
| 9,323,750 B2 | 4/2016 | Natanzon et al. |
| 9,342,465 B1 | 5/2016 | Meiri |
| 9,378,106 B1 | 6/2016 | Ben-Moshe et al. |
| 9,396,243 B1 | 7/2016 | Halevi et al. |
| 9,418,131 B1 | 8/2016 | Halevi et al. |
| 9,483,355 B1 | 11/2016 | Meiri et al. |
| 9,524,220 B1 | 12/2016 | Veprinsky et al. |
| 9,558,083 B2 | 1/2017 | LeCrone et al. |
| 9,606,739 B1 | 3/2017 | LeCrone et al. |
| 9,606,870 B1 | 3/2017 | Meiri et al. |
| 9,753,663 B1 | 9/2017 | LeCrone et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,055,161 B1 | 8/2018 | Meiri et al. |
| 10,095,428 B1 | 10/2018 | Meiri et al. |
| 10,152,527 B1 | 12/2018 | Meiri et al. |
| 10,238,487 B2 | 3/2019 | Alon et al. |
| 10,261,853 B1 | 4/2019 | Chen et al. |
| 2004/0268067 A1 * | 12/2004 | Yamagami .......... G06F 11/1471 711/159 |
| 2007/0245105 A1 * | 10/2007 | Suzuki ............... G06F 11/1451 711/162 |
| 2007/0283049 A1 * | 12/2007 | Rakowski ........... G06F 9/44505 709/246 |
| 2008/0071841 A1 * | 3/2008 | Okada ................ G06F 11/1471 |
| 2008/0120488 A1 * | 5/2008 | Woo .................. G06F 12/0246 711/209 |
| 2009/0037482 A1 * | 2/2009 | Arakawa ............ G06F 16/1815 |
| 2009/0113152 A1 * | 4/2009 | Eguchi ............... G06F 11/1456 711/162 |
| 2009/0132615 A1 * | 5/2009 | Shinozaki .......... G06F 11/1451 |
| 2011/0258406 A1 * | 10/2011 | Suetsugu ............ G06F 3/0608 711/162 |
| 2016/0077926 A1 * | 3/2016 | Mutalik .............. G06F 11/1453 711/162 |
| 2019/0026042 A1 * | 1/2019 | Gupta .................. G06F 3/0641 |

OTHER PUBLICATIONS

U.S. Appl. No. 15/076,946, filed Mar. 22, 2016, Meiri.
U.S. Appl. No. 15/085,188, filed Mar. 30, 2016, Meiri et al..
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/797,329, filed Oct. 30, 2017, Parasnis et al.
U.S. Appl. No. 15/971,153, filed May 4, 2018, Meiri et al.
U.S. Appl. No. 15/971,310, filed May 4, 2018, Kucherov et al.
U.S. Appl. No. 15/971,325, filed May 4, 2018, Kucherov et al.
U.S. Appl. No. 15/971,445, filed May 4, 2018, Kucherov et al.
U.S. Appl. No. 16/050,247, filed Jul. 31, 2018, Schneider at al.
U.S. Appl. No. 16/177,782, filed Nov. 1, 2018, Hu et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 16/396,880, filed Apr. 29, 2019, Meiri et al.
U.S. Appl. No. 16/398,595, filed Apr. 30, 2019, Kucherov et al.
U.S. Appl. No. 15/656,168, filed Jul. 21, 2017, Hu et al.

* cited by examiner

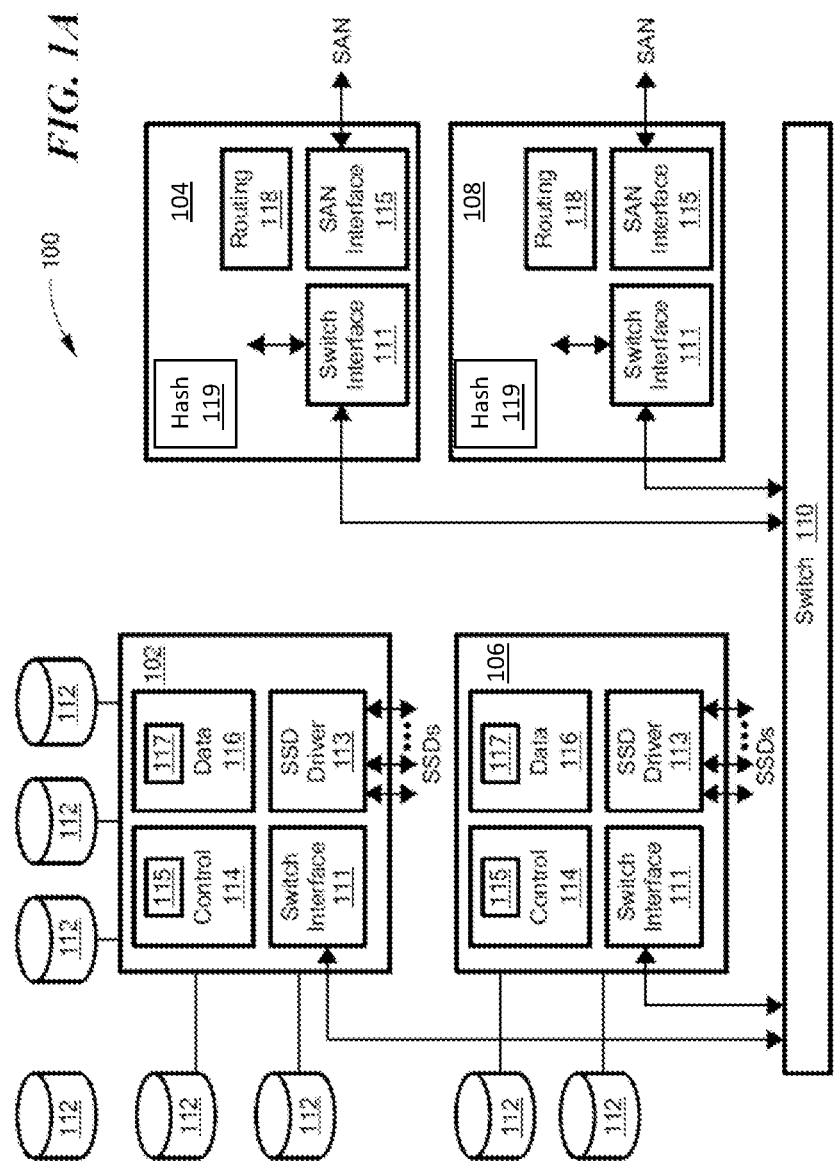

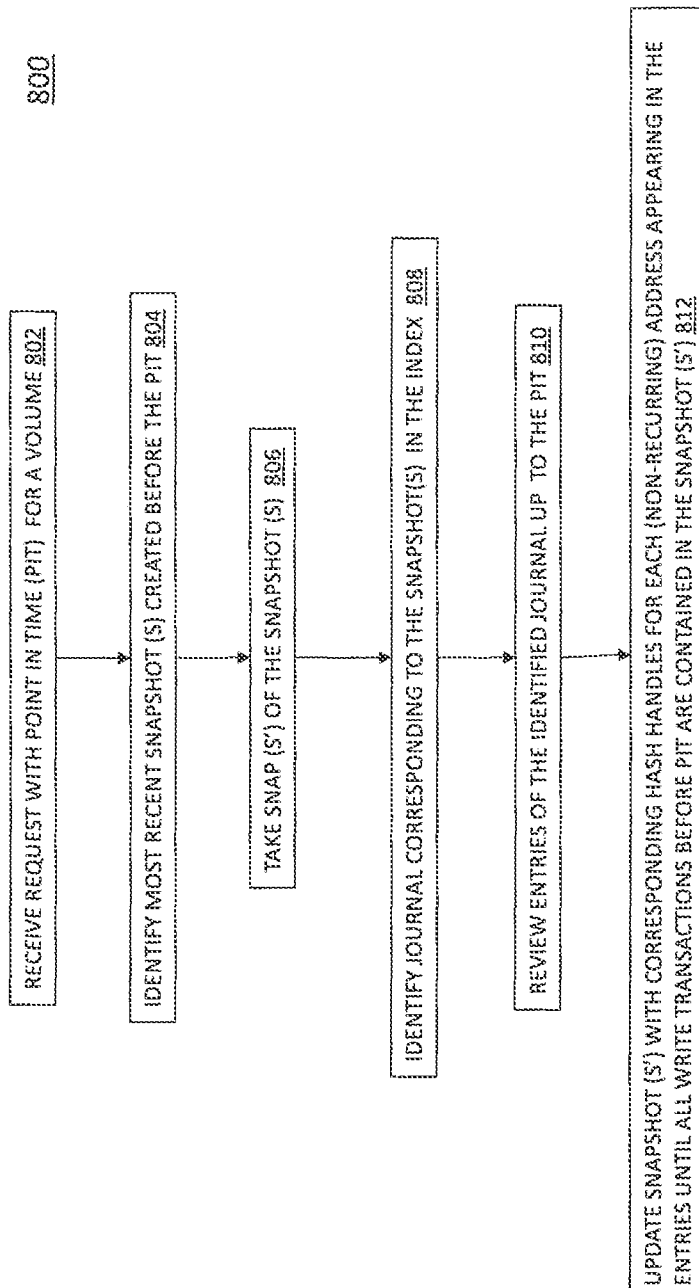

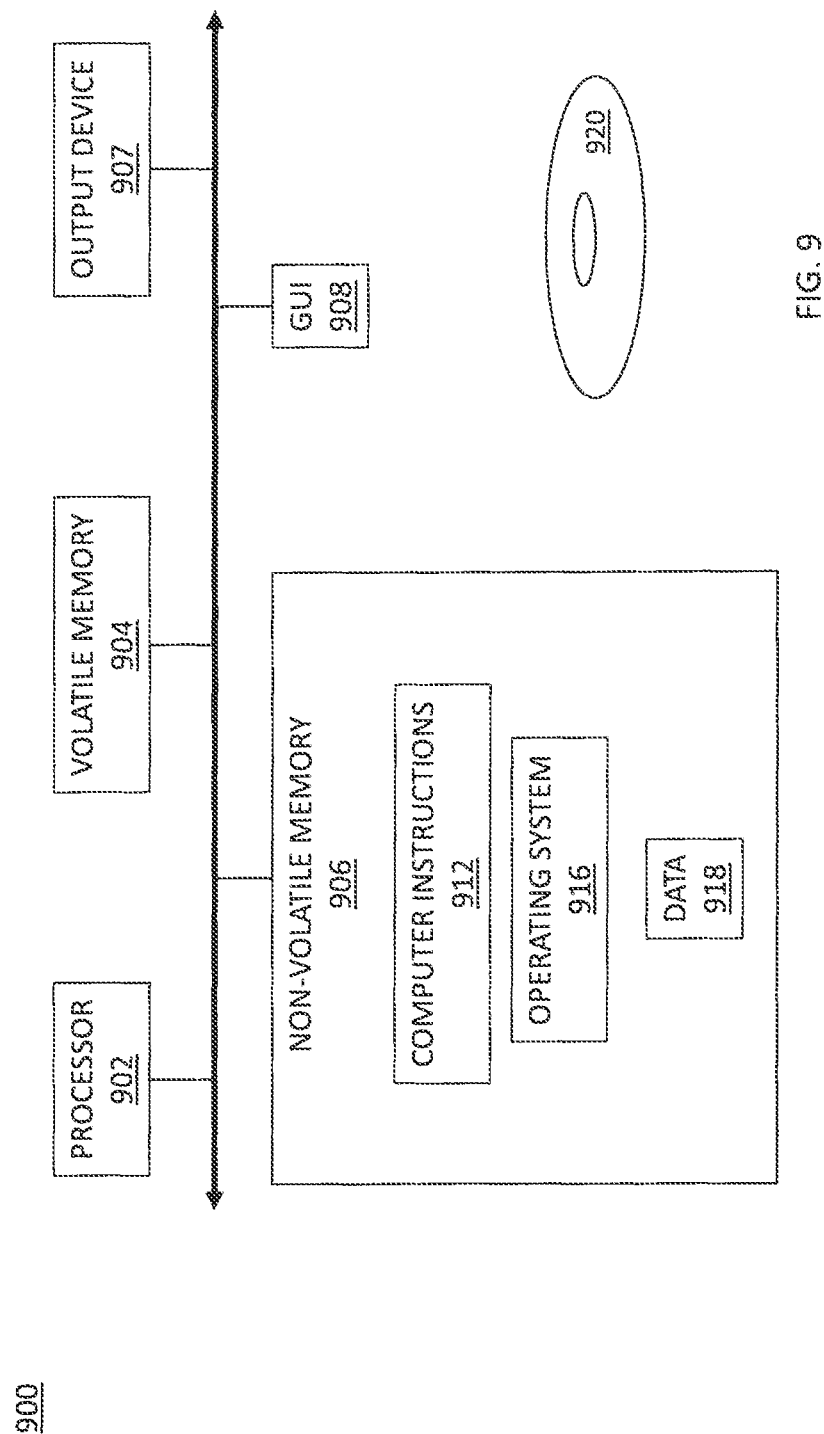

TIME ADDRESSABLE STORAGE IN A CONTENT ADDRESSABLE STORAGE SYSTEM

BACKGROUND

Computer data is vital to today's organizations, and content addressable storage systems (such as DELL EMC XTREMIO) (hereinafter "XtremIO") can support a rich set of advanced data services such as single data instance, compression, snapshots, etc., by decoupling storage access, logical volume address space, and physical on-disk location of data. In systems such as this, volume and physical layout metadata can offer tremendous flexibility in decoupling and virtualization.

In network environments where high-availability is a necessity, system administrators are constantly faced with the challenges of preserving data integrity and ensuring availability of critical system components, such as data systems and file systems. A significant part of protection of computer data against disasters is focused on data protection and on providing ways for computer systems to recover from disasters and other disruptions. Storage systems sometimes experience failures. For example, a storage device, such as a disk drive, may malfunction making the data stored therein inaccessible (at least temporarily). In addition, data stored on a storage system may become corrupted. To protect against data loss as result of data corruption, file system corruption, and/or hardware failure, storage systems frequently use one or more protection strategies, such as mirroring. Mirroring, also referred to as replication, can include maintaining a copy of data stored on a storage device on one or more other storage devices. When a failure occurs, e.g., on a production side device, information from a mirrored device can be used to rollback the system to a point in time prior to the loss event.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method to provide time addressable storage in a content addressable storage system. The method includes, for each of a plurality of volumes in the content addressable storage system, providing a log volume having an index and a journal. For each snapshot taken, the method includes entering a snapshot identifier of the snapshot in the index and increasing a corresponding journal offset in the index. For each write transaction received for a volume, the method includes recording a time, address, and hash handle as an entry in the journal. Upon receiving a user-selected point in time (PIT) for one of the volumes, the method includes identifying a most recent snapshot (S) created before the PIT, taking a snapshot (S') of the most recent snapshot (S), identifying one of the journals corresponding to the most recent snapshot (S) in the index, reviewing entries of the identified one of the journals up to the PIT, and updating the snapshot (S') with a corresponding hash handle for each address appearing in the reviewed entries until all write transactions before the PIT are contained in the snapshot (S').

Another aspect may provide a system for providing time addressable storage in a content addressable storage system. The system includes a memory having computer-executable instructions. The system also includes a processor operated by a storage system. The processor executes the computer-executable instructions. When executed by the processor, the computer-executable instructions cause the processor to perform operations. The operations include, for each of a plurality of volumes in the content addressable storage system, providing a log volume having an index and a journal. For each snapshot taken, the operations include entering a snapshot identifier of the snapshot in the index and increasing a corresponding journal offset in the index. For each write transaction received for a volume, the operations further include recording a time, address, and hash handle as an entry in the journal. Upon receiving a user-selected point in time (PIT) for one of the volumes, the operations also include identifying a most recent snapshot (S) created before the PIT, taking a snapshot (S') of the most recent snapshot (S), identifying one of the journals corresponding to the most recent snapshot (S) in the index, reviewing entries of the identified one of the journals up to the PIT, and updating the snapshot (S') with a corresponding hash handle for each address appearing in the reviewed entries until all write transactions before the PIT are contained in the snapshot (S').

Another aspect may provide a computer program product embodied on a non-transitory computer readable medium. The computer program product includes instructions that, when executed by a computer at a storage system, causes the computer to perform operations. The operations include, for each of a plurality of volumes in the content addressable storage system, providing a log volume having an index and a journal. For each snapshot taken, the operations include entering a snapshot identifier of the snapshot in the index and increasing a corresponding journal offset in the index. For each write transaction received for a volume, the operations further include recording a time, address, and hash handle as an entry in the journal. Upon receiving a user-selected point in time (PIT) for one of the volumes, the operations also include identifying a most recent snapshot (S) created before the PIT, taking a snapshot (S') of the most recent snapshot (S), identifying one of the journals corresponding to the most recent snapshot (S) in the index, reviewing entries of the identified one of the journals up to the PIT, and updating the snapshot (S') with a corresponding hash handle for each address appearing in the reviewed entries until all write transactions before the PIT are contained in the snapshot (S').

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 1A is a block diagram of a content-based storage system having multi-level cache for deduplicated storage for providing time addressable storage in accordance with an embodiment;

FIG. 8 is a flow diagram of a process for rolling back a volume to a point in time via the time addressable storage in a content addressable storage system in accordance with an embodiment; and FIG. 9 is a block diagram of an illustrative computer that can perform at least a portion of the processing described herein.

DETAILED DESCRIPTION

Figure 1B:
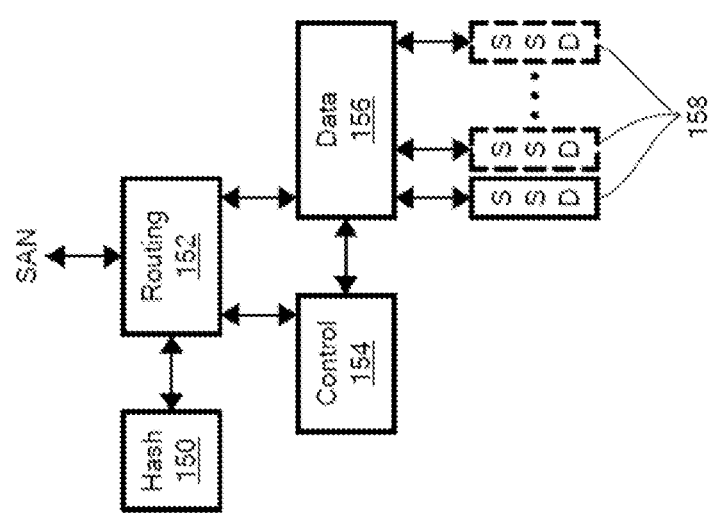
FIG. 1B illustrates further detail of the system of FIG. 1A.

Embodiments described herein provide time addressable storage in a content addressable storage system. Time addressable storage (TAS) enables a user to dial a volume to any point in time (PIT) in a continuum of time. It is comparable to having many snapshots, for example, a snapshot every second for the last 24 hours but without the costs of maintaining tens of thousands of snapshots. One benefit of TAS is the ability, in case of corruption, to find the latest version of the volume before the corruption occurred. The embodiments described herein enable TAS in a content addressable storage system using a combination of snapshots and logs.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, the term "IO request" or simply "IO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives. In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., IO data) issued to a storage system, which may be used to maintain a duplicate storage system, and to roll back the duplicate storage system to a previous point in time. In some embodiments, each entry in a journal contains, apart from the IO data itself, IO metadata that can include information such as a volume identifier (ID), the IO block offset within the volume, the IO length, and a time stamp of the IO.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, a "checkpoint" refers at least to an entity created by a checkpoint process, where the checkpoint process performs actions to preserve the state of an apparatus, system, or other entity (including software entities) at a particular time. Advantageously, a checkpoint includes information such as user data, the configuration of the apparatus, user metadata, and other information related to the internal state of the apparatus or system. For example, some storage systems (including XtremIO), in accordance with certain embodiments herein, also provide some kind of checkpoint feature, to provide an ability to preserve system state including user data and metadata at some defined point in time in order to restore this state after system malfunction or corruption. In certain embodiments, the checkpoint corresponds to a frozen, immutable re representation of the state of a system or apparatus at certain point in time, including user data, metadata, and the system configuration. In certain embodiments, the checkpoint is stored in a dedicated, reserved location within the system. In certain embodiments, the checkpoint is able to be created in an online, dynamic environment, where the checkpoint creation is transparent to entities having IO interactions with the system.

For a file system, the accuracy and consistency of a file system is necessary to relate applications and data, so a checkpoint provides a way to provide periodic backup of file server state to allow system recovery in the event of faults or failures. When data corruption is detected, one of the checkpoints can be used for file system recovery. Similarly, a checkpoint, in a virtualization context, is a snapshot of the state of a virtual machine. Like a restore point in MICROSOFT WINDOWS operating systems, a checkpoint allows an administrator to restore an entity (e.g., a computer system, a file system, an application, a virtual machine, etc.) to a previous state. Checkpoints also can be used to create backups before conducting updates. Should an update fail or cause problems, an administrator can return the virtual machine to its state prior to the update. A recover action is used to return the system to the checkpoint state.

In an exemplary Content Addressable Storage (CAS) array (e.g., as described in U.S. Pat. No. 9,208,162 (hereinafter "'162 patent"), which is hereby incorporated by reference), data is stored in blocks, for example of 4 KB, where each block has a unique large hash signature, for example of 20 bytes, saved on Flash memory. In certain embodiments, a long hash is a value computed based on a data packet, such as a SHA-1 hash that is 20 bytes in length, but this is not limiting. As described herein, hash signatures (also referred to herein as full hashes or long hashes) are accessed by small in-memory handles (called herein, interchangeably, hash handles, short hash handles or short hashes)), for example of 6 bytes. These handles are unique to each array, but not necessarily unique across arrays. A hash signature is unique, meaning that if two hash signatures are the same then their corresponding data blocks are the same. In certain embodiments, a hash signature may be represented by a short hash generated by using, for example, processes shown in FIG. 12A of the '162 patent. Short hashes are not necessarily world-wide unique, but in certain embodiments short hashes can be unique within a domain. In certain embodiments, the long hash can be computed or determined based on the short hash, using, for example, processes shown in FIG. 12C of the '162 patent.

In embodiments, a snap set may be defined as a group of snapshot volumes that are created at certain point in time. The system ensures data consistency among the snap shot volumes within the same snap set.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

FIG. 1A shows an illustrative content-based data storage system 100 with deduplication that may have multi-level data caches in accordance with embodiments of the disclosure. In the illustrated embodiment, first, second, third, and fourth nodes 102, 104, 106, 108 can be interconnected by a switch 110 via a switch interface 111. The first node 102 can include a control system 114 and a data system 116. In embodiments, separate data and control planes may be provided by the control and data systems 114, 116. The control system 114 may control execution of read and write commands to the storage devices 112. The data systems 116 may be connected to the storage devices 112 and, under control of a respective control system 114, may pass data to and/or from the storage devices via suitable storage drivers 113.

The data and/or control systems 114, 116 may retain extracts of the data stored in the storage devices 112. In embodiments, the data extracts may be generated by cryptographic hashing of the data content in the data blocks. In embodiments, the extracts may be used for content addressing of the data blocks to the physical storage devices 112.

The second node 104 can include a hash system 119 to generate the hash/extract, which can be referred to as a content fingerprint for the data blocks. The second node 104 can also include a routing system 118, along with a switch interface 111 and a SAN interface 115. The routing system 118 may terminate storage and retrieval operations and distribute commands to control systems 114 that may be selected for the operation in such a way as to retain balanced usage within the system. In the illustrated embodiment, the third node 106 can be similar to the first node 102 and the fourth node 108 can be similar to the second node 104.

The routing systems 118 may use the hash values calculated from data blocks to select control systems 114 for distribution. More particularly, selection of the control system 114 may use hash values or may rely on the user address and not on the content (hash). The hash value may, however, be used for selecting the data system 116, and for setting the physical location for data storage within the data system.

In example embodiments, control modules 114 (also referred to as "C-Modules") can include a C cache 115 and the data modules 116 (also referred to as "D-Modules") can include a D cache 117. As explained more fully below, the C cache 115 can include addresses and address hashes, and the D cache 117 can include, for each bucket, physical data location information, a filter, a hash to physical location, and bucket information. The control modules may be referred to as a logical layer, holds the metadata for the logical layer, and implements the volume/snapshot operations. The data module manages the SSDs and implements one or more RAID algorithms as described further herein.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

FIG. 1B is an example of a system that can include a hash (H) system 150 communicatively coupled to a routing (R) system 152, which can be communicatively coupled to a control (C) system 154 and a data (D) system 156. The data system 156 can be communicatively coupled to any practical number of memory devices 158. The routing system 152 can route read/write commands from a host (not shown) to control and data systems 154, 156 for execution. In embodiments, the data content-based mapping to physical storage 158 can distribute workload relatively evenly and provide separation of the control and data paths. Read and write operations to the SSDs 158 can be used to generate priority values for the data blocks, as described more fully below.

A function of the H module 150 is to calculate the Hash function value for a given block of data, e.g., data which is the subject of storage commands. The hash values calculated may later be used for retrieval. The Hash function may be based on standards based hash functions such as SHA-1 and MD5, or based on a proprietary function, but this is not limiting. The hash function is selected, in certain embodiments, to generate a uniformly distributed output over the range of potential input values. In certain embodiments, H modules 150 share nodes with an R module 152, but that is not limiting. More generally, the H modules 150 can reside in certain nodes, in all nodes, together with R modules 152, or together with C modules 154 or D modules 156.

A function of the R module 152 is to terminate storage area network (SAN) Read/Write commands and route them to appropriate C and D modules 154 and 156, for execution by these modules. By doing so, the R module 152 can distribute workload over multiple C and D modules 154, 156, and at the same time create complete separation of the Control and Data planes, that is to say provide separate control and data paths. In certain embodiments, the R module 152 routes SCSI IO request to the C modules 154, guarantees execution, and returns the result. In certain embodiments, the R module 152 maintains an up to date data structure called an address-to-control module (A→C or A2C) table, coordinated with the management back end (MBD), indicating which C module 154 is responsible for each logical X-page address (LXA), and also showing a balance a range of all possible LXAs between available C modules 154. In certain embodiments, for write operations, the R module 152 instructs the calculation of a hash digest for each X-page by requesting such calculation from a hash calculation module (e.g., the H module 150).

A function of the C module 154 is to control the execution of a Read/Write (R/W) command, as well as other storage functions implemented by the system. The C module 154 also may maintain and manage key metadata elements. In certain embodiments, the C module 154 receives an IO request from an R module 152 on a certain sub-LUN (SL), guaranteeing its atomic execution (i.e., execution independent of other processes) and returns the result to the R module 152. The C module 154 also communicates with D modules 156 to execute the IO requests. In addition, the C module 154 monitors the disk content of its logical space by associating each LXA with its hash digest; and balances the work load between the D modules for the SLs that the C module 154 is maintaining. The C module 154 and data module 156 each maintains certain data structures and corresponding metadata journals for those data structures. For example, the C module 154 maintains an "address to hash" table (A2H table, also referred to herein as A→H table) and corresponding A2H metadata journal, in the C module 154. The D module 156 maintains the "hash to physical location of data" table (H2P table, also referred to herein as H→P table) and its corresponding metadata journal in the D module 156. That is, in certain embodiments, the in-memory copy of a journal is in the same module as the corresponding metadata table. In certain embodiments, the on-disk journal copy is persisted and mirrored across nodes in the cluster in journal disk chunks.

The A2H table maps each LXA that belongs to the SLs that the C module 154 is responsible for, to the hash digest representing the X-page Data that currently resides in that address. The C module 154 maintains an A2H table in a persistent way. The C module 154 may initiate requests to D modules 156 in order to save table pages to disk and read them from disk. In addition, to avoid frequent disk operations, the C module 154 maintains a journal certain of the latest table operations. These journals include (but are not limited to) the A2H metadata journals (A2H Hash tree) and dirty tree update metadata journals. The dirty tree and corresponding functionality are described further in commonly assigned U.S. patent application Ser. No. 15/656,168 entitled "Online Metadata Backup Consistency Check," filed on Jul. 21, 2017, which is hereby incorporated by reference.

The data module (D) takes charge of Hash Metadata (HMD), physical layout (PL) metadata, hash to physical layout (H2P) mapping, H2P metadata journals, on disk block allocation (3WBM) and disk block allocation bitmap (3WBM) journals. For example, in certain embodiments, the metadata journals include information associated with time-based changes to information in the respective A2H and H2P tables and time-based changes to the disk block allocation bitmap.

The H2P table maps each range of hash digests to the corresponding D module 156 responsible for that range. The H2P table balances the range of all possible hash digests between the available D modules 156.

A function of the D module 156 is to perform the actual read/write (R/W) operation by accessing the storage devices 158 attached to it. The D module 156 may maintain metadata related with the physical location of data blocks. In certain embodiments, the D module 156 is responsible for: maintaining a set of LUNs which are attached locally and performing all IO operations on these LUN; managing the physical layout of the attached LUNs; managing the mapping between X-Page Data hash digests and their physical location in a persistent way; managing deduplication of X-Page Data in a persistent way; and receiving disk IO requests from C modules 154, perform them and returning a result.

In certain embodiments, the D module 156 is also responsible for, for each write operation, backing up the X-Page Data in the designated D backup module and performing read-modify operations for writes that are smaller than X-Page size (This process also involves, in certain embodiments, computing a hash digest for these X-Pages). In certain embodiments, the D module 156 maintains an up-to-date H→(D, $D_{backup}$) table coordinated with the MBE, where the H→(D, $D_{backup}$) table is expected to balance the range of all possible hash digests between the available D modules 156.

Balancing between the D modules is based on hashing of the content. For example, in certain embodiments, the D module 156 makes use of a hash digest metadata table. The hash digest meta data table maps each in use hash digest, that represents actual X-Page Data, to its meta data information including its physical page on the storage media (SSD), its memory copy (if exists), a mapping to any backup memory copy and a reference count for the purpose of deduplication. The D modules 156 manage a separate nonvolatile memory pool (NVRAM or UPS protected) for X-Page Data backup purposes. The backup holds X-Pages that are held in memory of the D primary and have not yet been destaged. This is an example of the user data destage cache (UDC). There are dirty X-pages waiting to be persisted on disk. When re-balancing between D modules 156 occurs (due to a D module 156 failure for example), the D module 156 may communicate with other D modules 156 in order to create new backup copies or move a primary ownership as required.

The D modules 156 allow deduplication per X-Page Data by maintaining a persistent reference count that guarantees only one copy per X-Page Data. The D modules 156 manage the hash digest metadata table in a persistent way. The table is coordinated with the physical layout for physical pages allocation, with the memory pointer, memory backup pointer, and deduplication reference count.

As will be appreciated, the R, C, D, and H modules 150-156 may be implemented in software, and executed on a physical node. In addition, the aforementioned '326 patent provides information relating to additional functionality of the R, C, D, and H modules 150-156, in certain embodiments.

Figure 2:
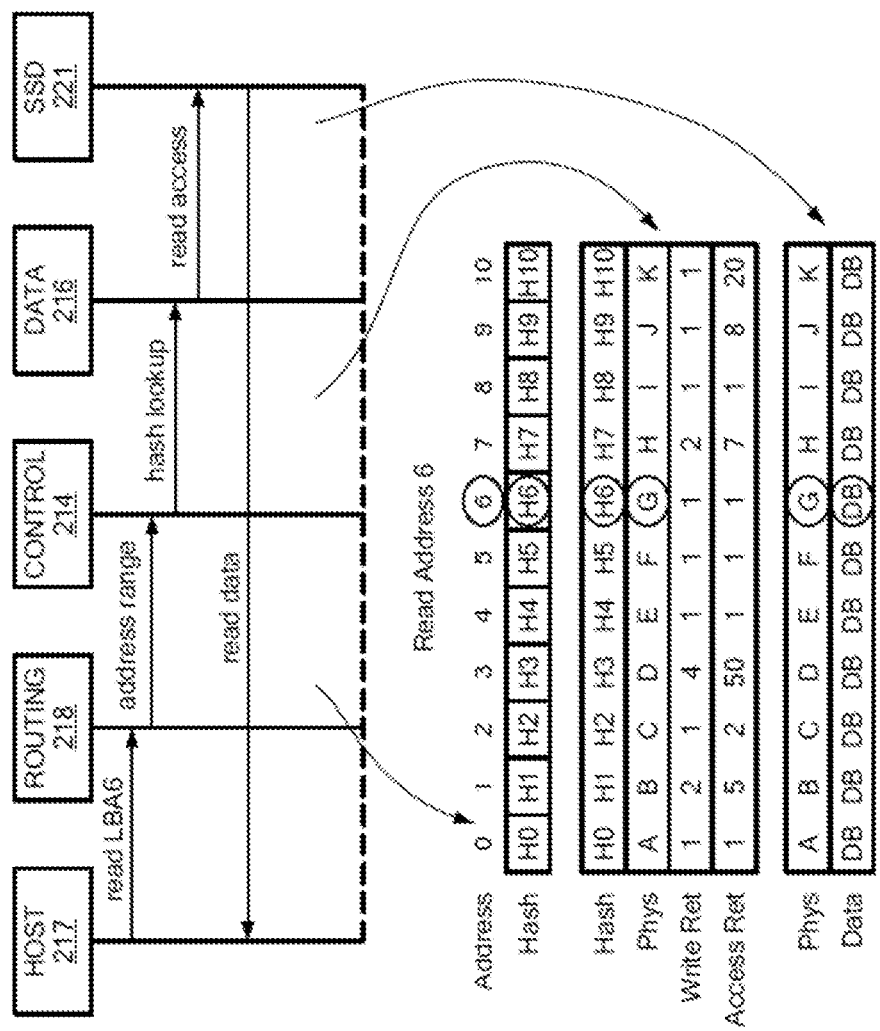
FIG. 2 is a flow diagram of read and write operations for the system of FIG. 1A.

FIG. 2 shows an example IO operation. A host 217 may issue a read command for a logical block address, which is shown as address "6," via a Fibre Channel or iSCSI port, for example. The routing system 218 may receive the read command and determine a requested address range in data blocks of 4K, for example, and pass the address information to the control system 214. The control system 214 may look up address 6 to obtain the hash value, which is shown as H6. This may be referred to as address-to-hash (A2H) lookup. The H6 hash value may be passed to the data system 216 which can perform a look up of the H6 hash value in a hash-to-physical address (H2P) table to read the physical address for the data. In the example, the physical address is shown as "G." The data system 216 can use the physical address to read the data block (DB) at physical address G in the SSD 221. A reference count can correspond to a number of times the hash value is referenced in physical storage. In embodiments, write reference information can be modified for each unique and/or deduplicated write and access reference information can be modified for each read and/or write access.

For a write operation from a host, the routing system 218 can receive the write data and can segment the data stream into data blocks and generate hash values for the data blocks. The hash value can be provided to the control system 214 to determine if the write data is unique. If unique, the hash value can be placed in an address mapping. The control system 214 can pass the hash value to the data system 216, which can assign the hash value to a physical address and write the data block(s) to the SSD at the physical address. In embodiments, the write reference information and/or the access reference information, can be modified, e.g., incremented, If the hash value generated by the routing system 218 is not unique, the control system 214 can determine that data already exists at the physical address for the hash value. Since the data already exists, the data system 216 can increment the write reference information for the data block. In embodiments, the access reference information can also be modified. The data may not be written to the SSD. Deduplication may refer to a write operation where a hash for a data block is found not be unique and the non-unique data block is not written to physical storage. The reference count for the non-unique hash may be incremented.

Figure 3:
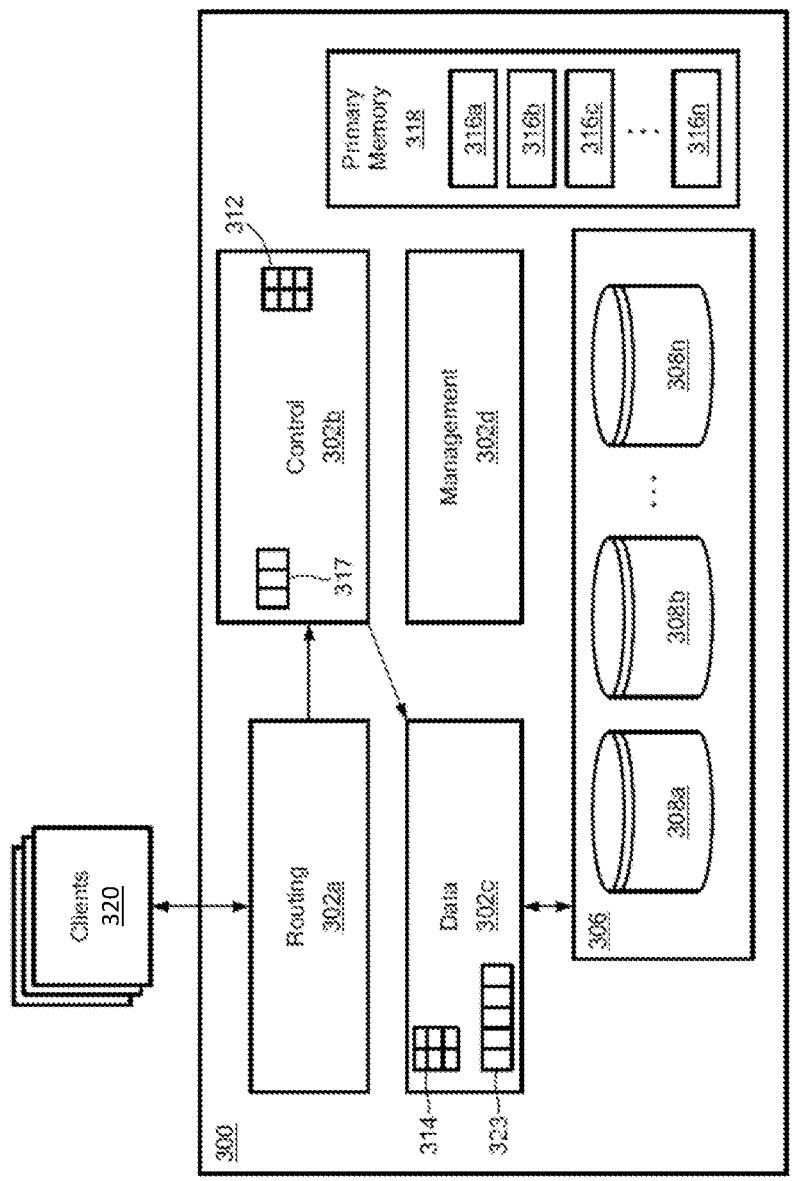
FIG. 3 is a block diagram of a content-based storage system having a control module with a first cache and a data module with a second cache.

FIG. 3 shows a storage system 300 according to an illustrative embodiment of the disclosure. The storage system 300 may be the same as or similar to a node within the distributed storage system of FIG. 1A. The storage system 300 may include a plurality of modules 302a-302d (generally denoted 302 herein), a storage array 306 comprising a plurality of storage devices 308a . . . 308n (generally denoted 308 herein), and a primary memory 318. In some embodiments, the storage devices 308 may be provided as solid-state devices (SSDs).

As described further herein, the storage system 300 also can include a C (also called logical) cache 317 and a D (also called physical) cache 323. The C cache 317 and/or the D cache 323 can, in certain embodiments, be physical devices configured to store certain data so that future requests for that data can be served faster. Although the C cache 317 and D cache 323 are shown as being part of the storage system, it is understood that the C cache 317 and/or D cache 323 can be located anywhere such that they are accessible quickly to the storage system. Data that is stored within a cache might include data values that have been computed earlier or duplicates of original values that are stored elsewhere. If the requested data is contained in the cache (herein referred to as a cache hit), this request can be served by simply reading the cache, which is comparatively faster than going to other types of memory. On the other hand, if the requested data is not contained in the cache (herein referred to as a cache miss), the data may have to be to be recomputed or fetched from its original storage location, which is comparatively slower. Hence, the greater the number of requests that can be served from the cache, the faster the overall system performance becomes.

The primary memory 318 can be any type of memory having access times that are faster compared to the storage devices 308. In some embodiments, primary memory 318 may be provided as dynamic random-access memory (DRAM). In certain embodiments, primary memory 318 may be provided as synchronous DRAM (SDRAM). In one embodiment, primary memory 318 may be provided as double data rate SDRAM (DDR SDRAM), such as DDR3 SDRAM.

As described above, the control subsystem 302b may be configured to maintain a mapping between IO addresses associated with data and the corresponding chunk hashes. As shown in FIG. 3, this mapping may be maintained using a data structure 312, referred to herein as an "IO address to chunk hash mapping table" or "A2H table," (also known as A→H table) according to some embodiments. In one embodiment, IO addresses may be logical addresses used by clients 320 to access data within the storage system 300.

As also described above, the data subsystem 302c may be configured to maintain a mapping between chunk hashes and physical storage addresses (i.e., storage locations within the storage array 306 and/or within individual storage devices 308). This mapping may be maintained using a data structure 314, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout. In certain embodiments, the H2P table is maintained to route data with different hashes to different D modules. The data subsystem 302c may be also be configured to read and write data from/to the storage array 306 (and/or to individual storage devices 308 therein).

As described above, in a content addressable storage system, data is stored in blocks, for example 16KB, 8KB, 4KB, etc., where each block has a universally unique large hash signature, for example of 20 bytes, which can be saved to disk, e.g., Flash memory. As described herein, hash signatures may be accessed by small in-memory handles (referred to herein as short hash handles, hash handles, or short hashes), for example of 6 bytes. These short hashes may be unique to each volume/array, but not necessarily unique across volumes/arrays. Additional information relating to hash-based replication, computation of hashes, generation and use of short hash handles can be found in U.S. Pat. No. 9,378,106 ("Hash Based Replication"); U.S. Pat. No. 9,208,162 ("Generating a Short Hash Handle") and U.S. Pat. No. 9,396,243 ("Hash-Based Replication Using Short Hash Handle and Identity Bit"), each of which is hereby incorporated by reference.

In embodiments, address to hash mapping (A2H) maps an address inside a volume to the short hash value of its data. In embodiments, meta data can include for each address the hash value of the content. If the basis for deduplication is 16KB, then the meta data holds for each address the short hash value of the data to which the address points. In cases where access to the volume is in larger chunks than the size of the basic hash value, the meta data for the address space can be readily cached.

As also noted above, hash to physical disk locations can include for each hash key (e.g., 6 bytes) the location on the disk, and the reference count. Where a storage system uses hash keys of 6 bytes, there may be collisions of data generating the same hash. If there is a collision, a new hash key from a different hash address space is generated for the data when the data is written. This means that the hash to physical disk location table may search for a hash value every time a new write arrives. If the write has the same hash value, there is a need to check the long hash value, and verify if there is a hash collision, or whether it is actually the same data. This means that during every write if the hash to physical disk location table is not in the system memory, there may a need to fetch the meta data of the hash from the disk to verify if such a hash exists. It will be appreciated that meta data structures may consume most of system memory, e.g., DRAM, in the storage system, so that the meta data limits the total size of the storage system.

Figure 4:
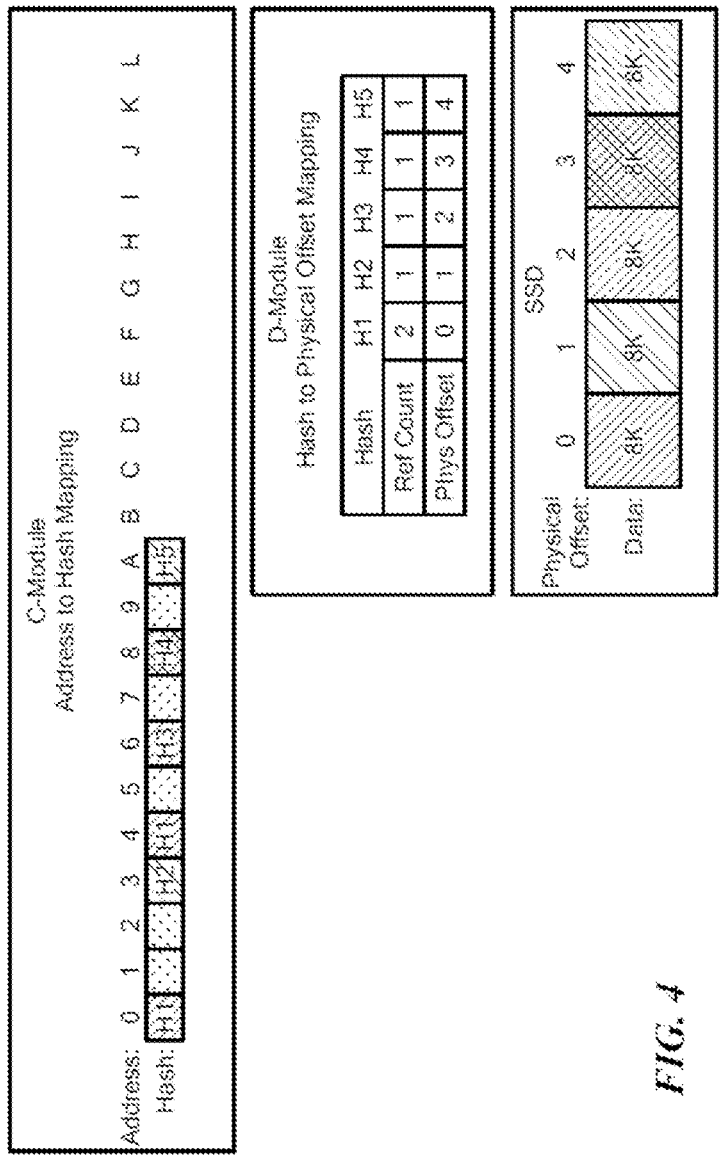
FIG. 4 is a schematic representation of address-to-hash (A2H) mapping in a control module and hash-to-physical (H2P) mapping in a data module for a content-based storage system.

FIG. 4 shows an example control or C module address to hash (A2H) mapping 400. As can be seen, as data blocks arrive, the content for the address is hashed to generate H1, H2, H3, H4, H5, as shown. It should be noted that H1 appears twice and is deduplicated. The D-module includes a hash to physical (H2P) mapping showing the physical offset of the data along with a reference count indicative of how many times a given hash value occurs. It will be appreciated that a particular hash value having a high reference count will likely be accessed more often than hash values having a low reference count. In embodiments, a reference count is incremented each time the hash value is generated in a volume. Thus, higher reference count hash values may be preferred for placement in D cache over low reference count hash values. It can be seen that the physical offset corresponds to the order in which a unique hash value is generated. For example, H3 is shown with an offset value of 2 since a second H1 value was deduplicated.

Figure 5:
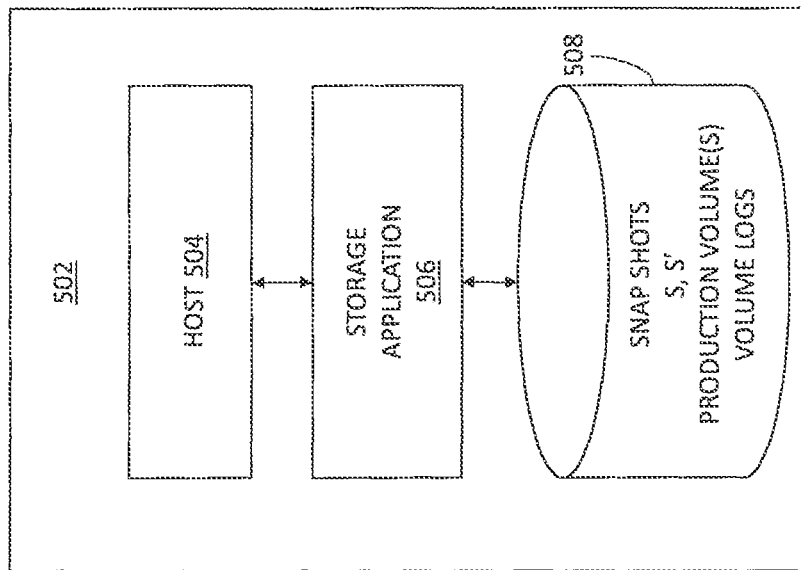
FIG. 5 is a simplified block diagram of a content addressable system for providing time addressable storage in accordance with an embodiment.

Turning now to FIG. 5, an example storage system 500 for performing time addressable storage in a content addressable storage system will now be described. Storage system 500 includes a replication system 502.

Replication system 502 may include a host 504, storage application 506, and data storage 508. In some embodiments, storage 508 may include one or more storage volumes (e.g., production volumes), that operate as active, or production, volumes.

Host 504 may perform IO operations on storage 508 (e.g., read data from and write data to storage 508). The write operations are also referred to herein as write transactions. In some embodiments, the IO operations may be intercepted by and controlled by the storage application 506. As changes are made to data stored on storage 508 via the IO operations from host 504, or over time as storage system 500 operates, storage application 506 may perform data replication (e.g., local replication) at the replication system 502.

In illustrative embodiments, storage system 500 may employ a snapshot (or replication) mechanism to replicate data locally at the replication system 502. A snaphot (or replica) may be created from data within storage 508.

As described herein, in example embodiments, data replication refers to synchronous data replication with snapshots created in dynamic intervals during operation of storage system 500. The timing of synchronous replication cycles and the retention of the replicas may be managed by the storage application 506.

In embodiments, the policy may include the creation of volume logs for use in implementing time addressable storage, as described herein. A user of the system 500 may identify one or more volumes to which the time addressable storage features is to be applied. In response to this identification, the system 500 may generate a volume log in the storage 508. It will be understood that the volume log may be created and maintained in our storage elements of the system 500 and is not limited to the storage 508 as shown in FIG. 5.

Figure 6:
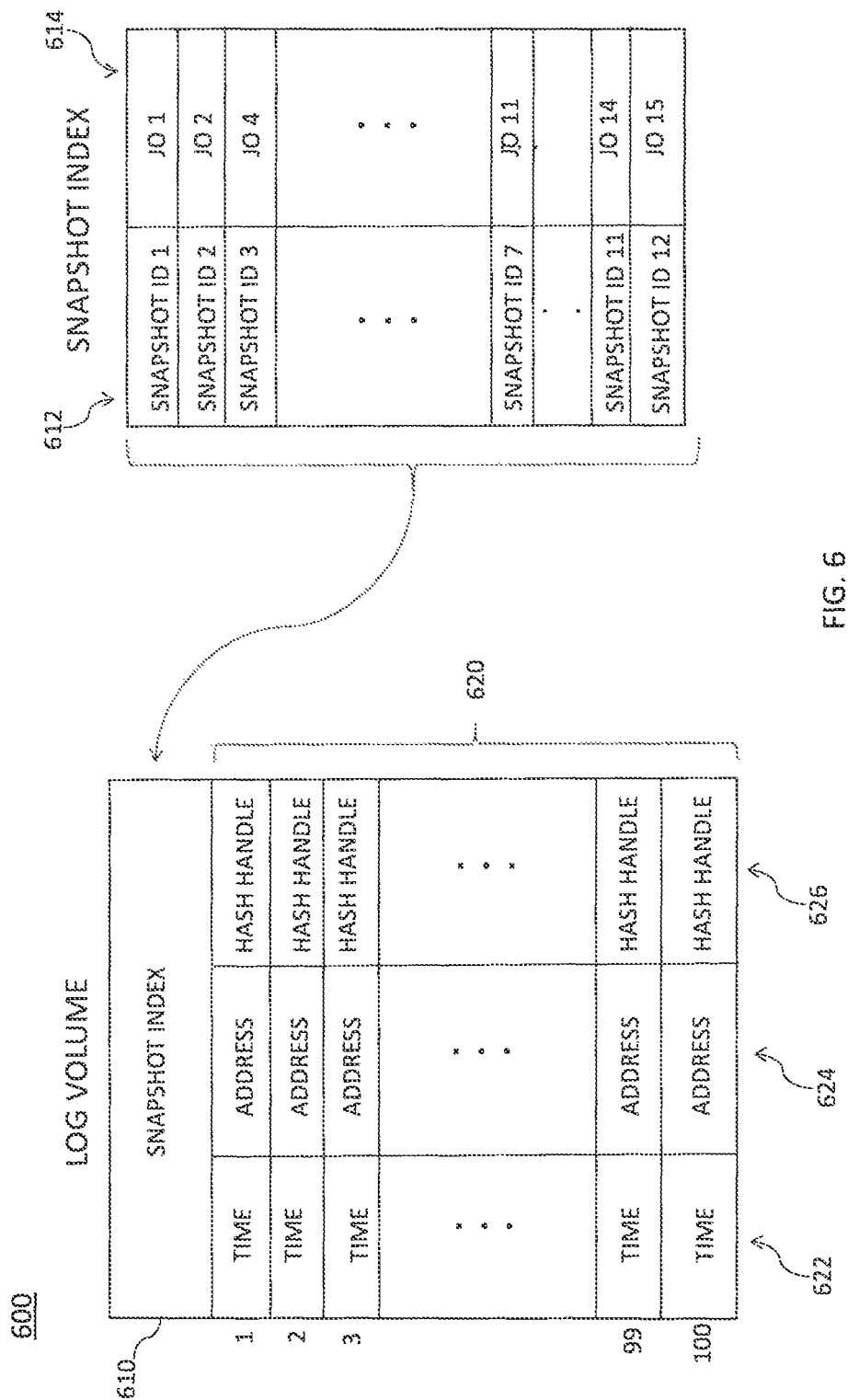
FIG. 6 is a log volume for use in providing time addressable storage in a content addressable storage system in accordance with an embodiment.
Figure 7:
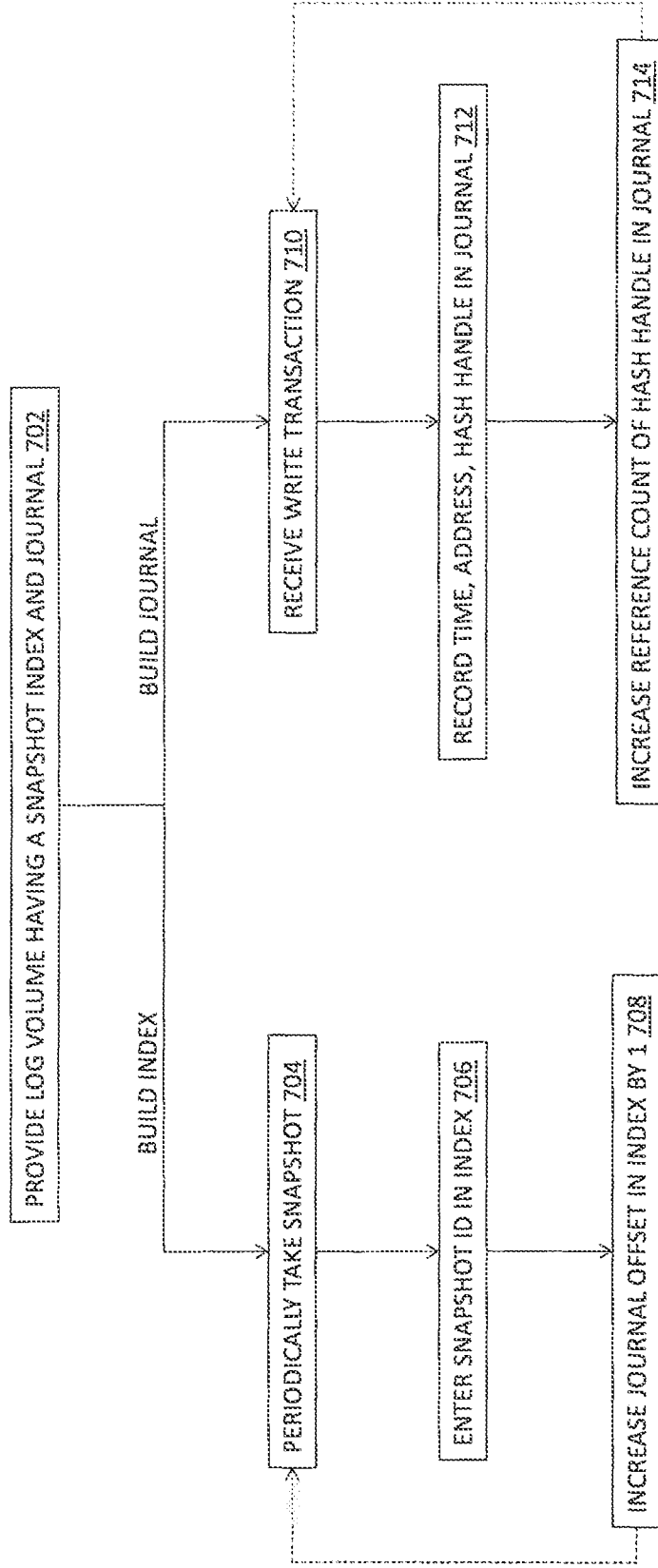
FIG. 7 is a flow diagram of a process for building a log volume index and journal for use in implementing time addressable storage in a content addressable storage system in accordance with an embodiment.

As indicated above, it is advantageous to be able to move a volume back in time, or view a volume at an earlier time for any given time, not just one out of a set of snapsets. The embodiments described herein enable a content addressable storage system to implement time addressable storage that can move a volume back to any point in time (PIT), and at the granular level of a given write transaction. FIG. 6 illustrates a log volume 600 for use in implementing the time addressable storage in a content addressable storage system, while FIGS. 7 and 8 illustrate processes for implementing time addressable storage using the log volume 600 of FIG. 6. In particular, FIG. 7 illustrates a flow 700 for building a log volume index and journal, while FIG. 8 illustrates a flow 800 for viewing or rolling back a volume to a particular PIT.

In block 702, a log volume (e.g., log volume 600) is provided. In an embodiment, the log volume may be created in response to a user request to protect a particular volume using time addressable storage.

The log volume 600 includes a snapshot index 610 and a journal 620. For purposes of illustration, an enlarged version of the snapshot index 610 is shown in FIG. 6. The snapshot index 610 includes a column 612 for entering snapshot identifiers (IDs), and another column 614 for entering journal offsets (JOs). Upon creation of a new snapshot index, the JO is initialized to zero (not shown) and is incremented each time a new snapshot ID is entered. The snapshot index 610 may be created as a first page of the log volume 600.

The process of building the snapshot index 610 is described in blocks 704-708 of FIG. 7, and the process of building the journal 620 is described in blocks 710-714 of FIG. 7. It will be understood that blocks 704-708 and 710-714 may be performed in tandem. For instance, as write transactions are received, they are processed in the journal in blocks 710-714, and as snapshots are periodically taken (e.g., one every few minutes), they are processed in the snapshot index in blocks 704-708. In addition, it is understood that blocks 704-708 may be repeated as long as snapshots are taken for a volume. Likewise, blocks 710-714 may be repeated as long as new write transactions are received at the system.

In block 704, the system periodically takes a snapshot of the volume. The frequency in which the snapshots are taken may be a function, for example, of a policy, e.g., a new snapshot is taken every five minutes or every 10,000 writes. When each snapshot is taken, a snapshot ID for that snapshot is entered into the index 610 in block 706. For example, as shown in FIG. 6, snapshot IDs 1-12 are shown in the index 610. Each time a new snapshot ID is entered, the JO is increased by 1 in block 708. The JO may be increased based upon other factors, such as when a journal page becomes full. The journal offset is used to read the entire journal associated with a snapshot including all entries whose timestamp is not greater than the point in time. The journal offset points to the first possible entry, and from there the entries are read sequentially.

As indicated above, new write transactions are also processed in the log volume 600. In block 710, a new write transaction is received. The time of the write transaction, as well as its address, and hash handle are recorded in the journal 620 in block 712. As shown in FIG. 6, the time is recorded in column 622, the address is recorded in column 624, and the hash handle is recorded in column 626. If the write transaction covers multiple writes spanning multiple pages, they can be entered each with the same time in column 622. In addition, a reference count of the hash handle in the journal is incremented for each new write transaction in block 714. The reference count is used to prevent the system from deleting pages that are no longer referenced by the volume or by the snap, but are still referenced by the journal. When a user disables time addressable protection for the volume, the journal may be deleted, all of the reference counts are adjusted downward, and the hashes are allowed to be deleted if the reference count goes down to zero.

As indicated above, FIG. 8 illustrates a process 800 for viewing or rolling back a volume to a particular point in time (PIT). In block 802, the system receives a request with a PIT for a volume. For example, the PIT may correspond to entry 99 in journal 620 of FIG. 6. In block 804, the most recent snapshot (S) that was created before the PIT is identified. For example, the most recent snapshot (S) created before PIT may correspond to snapshot ID 9 in snapshot index 610 of FIG. 6.

In block 806, a snap (S') is taken of the snapshot (S). In block 808, the journal corresponding to the snapshot (S) is identified in the index. As indicated above, a journal offset is used to read the entire journal associated with a snapshot including all entries whose timestamp is not greater than the point in time. The journal offset points to the first possible entry, and from there the entries are read sequentially. The process then uses the identified journal to review entries. In block 810, the process 800 reviews each of the entries of the journal up to the PIT. For example, if the entries 1-100 in journal 620 correspond to the identified snapshot (S), each of these entries is reviewed. In block 812, the snapshot (S') is updated with the corresponding hash handles for each address appearing in the entries until all write transactions before the PIT are contained in the snapshot (S'). As a single address may appear multiple times in the journal, and the journal is traversed chronologically, the last entry for the address will be used in the snapshot S'.

By deleting older journals and snapshots, it is possible to maintain a retention policy of graduating granularity. In addition, journals created for the time addressable storage process described herein can be used as a replacement for journaling A2H tables.

FIG. 9 shows an exemplary computer 900 (e.g., physical or virtual) that can perform at least part of the processing described herein. The computer 900 includes a processor 902, a volatile memory 904, a non-volatile memory 906 (e.g., hard disk or flash), an output device 907 and a graphical user interface (GUI) 908 (e.g., a mouse, a keyboard, a display, for example). The non-volatile memory 906 stores computer instructions 912, an operating system 916 and data 918. In one example, the computer instructions 912 are executed by the processor 902 out of volatile memory 904. In one embodiment, an article 920 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

We claim:

1. A method for time addressable storage in a content addressable storage system, comprising:
   for each volume of a plurality of volumes in the content addressable storage system, providing a distinct log volume for each volume of the plurality of volumes, the log volume having a snapshot index and a journal, the snapshot index being separate from the journal, the snapshot index configured to record snapshots of the volume, the journal configured to record write transactions for the volume and issued to the content addressable storage system;
   for each snapshot taken for a volume, entering a snapshot identifier of the snapshot in the snapshot index of the log volume corresponding to the volume and increasing a corresponding journal offset in the snapshot index of the log volume corresponding to the volume;
   for each write transaction received for a volume, recording a time, an address, and a hash handle of each received write transaction as an entry in the journal of the log volume corresponding to the volume; and
   responsive to receiving a user-selected point in time (PIT) for one of the volumes, applying the log volume corresponding to the one of the volumes to roll back the one of the volumes to the user-selected PIT.

2. The method of claim 1, wherein the applying the log volume includes:
   identifying a most recent snapshot (S) created before the PIT;
   taking a snapshot (S') of the most recent snapshot;
   identifying one of the journals corresponding to the most recent snapshot (S) in the index;
   reviewing entries of the identified one of the journals up to the PIT; and
   updating the snapshot (S') of the most recent snapshot (S) with a corresponding hash handle for each address appearing in the reviewed entries until all write transactions before the PIT are contained in the snapshot (S') of the most recent snapshot (S).

3. The method of claim 1, further comprising, for each write transaction, increasing a reference count of a corresponding hash handle of the write transaction.

4. The method of claim 1, further comprising deleting a previously created journal while maintaining a set of snapshots corresponding to the previously created journal.

5. The method of claim 1, wherein the PIT is received with a request to roll back one of the plurality of volumes to the PIT, wherein the snapshot (S') of the most recent snapshot reflects the one of the plurality of volumes at the PIT.

6. The method of claim 1, wherein the log volume is created in response to a request to protect a corresponding volume of the plurality of volumes with time addressable storage protection for any PIT.

7. The method of claim 1, wherein the recording a time, an address, and a hash handle as an entry in the journal includes, responsive to determining the write transaction covers multiple pages, recording multiple entries in the journal, each of the multiple entries recorded with the same time.

8. The method of claim 1, further comprising:
   responsive to determining journal entries in the journal are full, increasing the journal offset in the snapshot index.

9. A system for time addressable storage in a content addressable storage system, the system comprising:
   a memory comprising computer-executable instructions; and
   a processor operable by a storage system, the processor executing the computer-executable instructions, the computer-executable instructions when executed by the processor cause the processor to perform operations comprising:
      for each volume of a plurality of volumes in the content addressable storage system, providing a distinct log volume for each volume of the plurality of volumes, the log volume having a snapshot index and a journal, the snapshot index being separate from the journal, the snapshot index configured to record snapshots of the volume, the journal configured to record write transactions for the volume and issued to the content addressable storage system;
      for each snapshot taken for a volume, entering a snapshot identifier of the snapshot in the snapshot index of the log volume corresponding to the volume and increasing a corresponding journal offset in the snapshot index of the log volume corresponding to the volume;

for each write transaction received for a volume, recording a time, an address, and a hash handle of each received write transaction as an entry in the journal of the log volume corresponding to the volume; and responsive to receiving a user-selected point in time (PIT) for one of the volumes, applying the log volume corresponding to the one of the volumes to roll back the one of the volumes to the user-selected PIT.

10. The system of claim 9, wherein the applying the log volume includes:

identifying a most recent snapshot (S) created before the PIT;

taking a snapshot (S') of the most recent snapshot;

identifying one of the journals corresponding to the most recent snapshot (S) in the index;

reviewing entries of the identified one of the journals up to the PIT; and updating the snapshot (S') of the most recent snapshot with a corresponding hash handle for each address appearing in the reviewed entries until all write transactions before the PIT are contained in the snapshot (S') of the most recent snapshot.

11. The system of claim 9, wherein the operations further comprise, for each write transaction, increasing a reference count of a corresponding hash handle of the write transaction.

12. The system of claim 9, wherein the operations further comprise deleting a previously created journal while maintaining a set of snapshots corresponding to the previously created journal.

13. The system of claim 9, wherein the PIT is received with a request to roll back one of the plurality of volumes to the PIT, wherein the snapshot (S') of the most recent snapshot (S) reflects the one of the plurality of volumes at the PIT.

14. The system of claim 9, wherein the log volume is created in response to a request to protect a corresponding volume of the plurality of volumes with time addressable storage protection for any PIT.

15. The system of claim 9, wherein the recording a time, an address, and a hash handle as an entry in the journal includes, responsive to determining the write transaction covers multiple pages, recording multiple entries in the journal, each of the multiple entries recorded with the same time.

16. A computer program product embodied on a non-transitory computer readable medium, the computer program product including instructions that, when executed by a computer, causes the computer to perform operations comprising:

for each volume of a plurality of volumes in the content addressable storage system, providing a distinct log volume for each volume of the plurality of volumes, the log volume having a snapshot index and a journal, the snapshot index being separate from the journal, the snapshot index configured to record snapshots of the volume, the journal configured to record write transactions for the volume and issued to the content addressable storage system;

for each snapshot taken for a volume, entering a snapshot identifier of the snapshot in the snapshot index of the log volume corresponding to the volume and increasing a corresponding journal offset in the snapshot index of the log volume corresponding to the volume;

for each write transaction received for a volume, recording a time, an address, and a hash handle of each received write transaction as an entry in the journal of the log volume corresponding to the volume; and responsive to receiving a user-selected point in time (PIT) for one of the volumes, applying the log volume corresponding to the one of the volumes to roll back the one of the volumes to the user-selected PIT.

17. The computer program product of claim 16, wherein the applying a log volume includes:

identifying a most recent snapshot (S) created before the PIT;

taking a snapshot (S') of the most recent snapshot;

identifying one of the journals corresponding to the most recent snapshot (S) in the index;

reviewing entries of the identified one of the journals up to the PIT; and updating the snapshot (S') of the most recent snapshot (S) with a corresponding hash handle for each address appearing in the reviewed entries until all write transactions before the PIT are contained in the snapshot (S') of the most recent snapshot (S).

18. The computer program product of claim 16, wherein the operations further comprise, for each write transaction, increasing a reference count of a corresponding hash handle of the write transaction.

19. The computer program product of claim 16, wherein the operations further comprise deleting a previously created journal while maintaining a set of snapshots corresponding to the previously created journal.

20. The computer program product of claim 16, wherein the PIT is received with a request to roll back one of the plurality of volumes to the PIT, wherein the snapshot (S') of the most recent snapshot (S) reflects the one of the plurality of volumes at the PIT.

* * * * *